United States Patent
Grabenstetter et al.

(10) Patent No.: US 6,547,481 B2
(45) Date of Patent: Apr. 15, 2003

(54) SPRING-LOADED WEDGE DEAD END CONNECTOR HAVING ELEMENTS FOR COUPLING TOGETHER AND PREVENTING REMOVAL OF CONDUCTOR-GRIPPING JAWS

(75) Inventors: Karl D. Grabenstetter, Valley City, OH (US); Justin C. Andrikanich, Stow, OH (US); Waymon P. Goch, Clinton, OH (US)

(73) Assignee: Hubbell Incorporated, Orange, CT (US)

( * ) Notice: Subject to any disclaimer, the term of this patent is extended or adjusted under 35 U.S.C. 154(b) by 145 days.

(21) Appl. No.: 09/779,695

(22) Filed: Feb. 8, 2001

(65) Prior Publication Data

US 2002/0106239 A1 Aug. 8, 2002

(51) Int. Cl.$^7$ .............................. B25G 3/20; F16B 2/14; F16B 2/18; F16B 7/04
(52) U.S. Cl. ............... 403/374.2; 24/136 R; 24/115 M; 294/102.1
(58) Field of Search ............................ 403/374.2, 374.1, 403/275; 24/136 R, 115 M, 132 R, 132 WL; 174/65 SS; 294/102.1; 16/205

(56) References Cited

U.S. PATENT DOCUMENTS

| | | |
|---|---|---|
| 482,975 A | 9/1892 | Cope |
| 922,814 A | 5/1909 | Reece |
| 1,509,565 A | 9/1924 | Oswald |
| 3,758,922 A | 9/1973 | Field |
| 3,912,406 A | 10/1975 | McGrath |
| 4,183,686 A | 1/1980 | DeFrance |
| 4,407,471 A | 10/1983 | Wilmsmann et al. |
| 4,872,626 A | 10/1989 | Lienart |
| 5,015,023 A | 5/1991 | Hall |
| 5,539,961 A | 7/1996 | DeFrance ................. 24/136 R |
| 6,076,236 A | 6/2000 | DeFrance ................. 24/136 R |

*Primary Examiner*—Christopher J. Novosad
(74) *Attorney, Agent, or Firm*—Michael R. Swartz; Mark S. Bicks; Alfred N. Goodman

(57) ABSTRACT

A spring-loaded wedge dead end connector includes a connector body having a base and a pair of opposite jaw guides formed on and protruding outwardly from the base and defining a guide channel therewith, a pair of jaws mounted between the jaw guides and on the base of the connector body for undergoing slidable movement within the guide channel thereof along converging paths from an open position for receiving a segment of an electrical conductor therebetween to a closed position in which the jaws provide a clamping wedging engagement with the electrical conductor segment disposed therebetween, a plurality of complementary elements formed on the jaws such that the complementary elements directly and slidably interfit with one another so as to ensure that the jaws are coupled to one another to undergo their slidable movement together, and a plurality of retention elements for preventing removal of the jaws from the connector body.

43 Claims, 5 Drawing Sheets

SPRING-LOADED WEDGE DEAD END CONNECTOR HAVING ELEMENTS FOR COUPLING TOGETHER AND PREVENTING REMOVAL OF CONDUCTOR-GRIPPING JAWS

BACKGROUND OF THE INVENTION

1. Field of the Invention

The present invention generally relates to a dead end connector for gripping and securing wires, such as electrical conductors on power lines, and, more particularly, is concerned with a spring-loaded wedge dead end connector having elements for coupling together and preventing removal of conductor gripping jaws.

2. Description of the Prior Art

In the field of electrical power distribution and transmission, electrical power lines must be periodically anchored to supporting structures, such as towers, and strung between the supporting structures in a series leading from an electric power generator to a point of use. Couplings, commonly referred to as dead ends or dead end connectors, are frequently used to attach the electrical power lines to the supporting structures, or, more precisely, to insulated mounts attached to the supporting structures.

Heretofore, dead end connectors such as disclosed in U.S. Pat. No. 5,539,961 to DeFrance have been used for this purpose. This patent discloses a spring-loaded wedge dead end connector which includes an elongated connector body having opposite rear and front ends, a single leg and an extension wall disposed in tandem relationship between the opposite ends, and a pair of opposite jaw guides formed on and protruding outwardly from the extension wall. A clevis is formed on the rear end of the body and used for fastening the connector to a pole or the like. The jaw guides are disposed in a spaced angular relationship to one another and with the extension wall define a U-shaped channel. The jaw guides converge toward each other so that the U-shaped channel gradually narrows in its transverse dimension as the jaw guides extend along the extension wall in a lengthwise direction of the connector body from the rear end to the front end thereof. The extension wall has a pair of recessed tracks defined therein which extend parallel to and along the jaw guides and thus converge in the same manner toward each other, and a central longitudinal recess defined therein extending between the recessed tracks and along the lengthwise direction of the connector body.

The DeFrance connector further includes a pair of opposing jaws slidably supported in the U-shaped channel between the jaw guides and on the extension wall, and a floater member separate from the jaws and having a planar wedge-shaped configuration and being disposed between the extension wall and the jaws. The jaws have respective inner arcuate faces disposed parallel to and opposing one another with teeth protruding therefrom, backsides facing the floater member, pairs of raised spaced guides defined on and protruding from the backsides, and elongated ribs defined along outer edges of the backsides and protruding into the recessed tracks in the extension wall and thus extending along the jaw guides. The floater member has an end tab at a front end thereof and a pair of opposed cutouts defining a pair of opposed side tabs at a rear end thereof such that the end tab protrudes into the central longitudinal recess of the extension wall and the side tabs fit into spaces between the pairs of raised spaced guides of the jaws and thereby couples the jaws together for slidable movement with the floater member within the U-shaped channel. As the jaws are slidably moved with the floater member toward the front end of the connector body from a rearward open position in which an electrical conductor segment of a electrical power line can be inserted between the jaws, the floater member moves forwardly along the lengthwise direction of the connector body while the jaws move concurrently forwardly and laterally inwardly toward one another and converge toward the lengthwise direction of the connector body such that the teeth of the inner arcuate faces of the jaws will bite into the electrical conductor segment of the power line disposed between the jaws to form a clamping wedging engagement therebetween. A coil spring disposed in the central longitudinal recess of the extension wall under the floater member and rearwardly of the end tab thereof. The coil spring becomes compressed by the end tab as the floater member is moved toward the rear end of the connector body with the jaws. Thus, the coil spring biases the floater member and thereby the jaws to move toward the front end of the connector body to a forward closed position of the jaws in which the jaws make the clamping wedging engagement with the conductor segment of the power line. One of the raised guides on the backside of one of the jaws has a corner notch defined therein and one of the tabs on the floater member is lodgeable in the corner notch to lock the jaws in the rearward open position once the jaws have been slidably moved rearwardly to the rearward open position. The jaw guides have respective rims which project inwardly a short distance into the U-shaped channel so as to overlap outer edge portions of the jaws and thereby maintain the ribs of the jaws protruding into the recessed tracks defined in the extension wall along the respective jaw guides.

While the jaws of the above-described prior art dead end connector of the DeFrance patent function reasonably well in gripping and holding the conductor segment of the power line therebetween through their clamping wedging engagement therewith, the connector requires the employment of a separate floater member under the jaws to lock them at and release them from their open position and thereby ensure that the jaws move in unison along the jaw guides. The requirement for the floater member separate from the jaws to couple the jaws together increases the complexity and the cost of the DeFrance prior art dead end connector and tends to make it more difficult to operate and to increase the opportunity for the parts of the floater member and the jaws which have to slide in opposite directions relative to one another to bind with one another and thereby impede the relative movement and thus the reliability of the jaws and floater member.

Consequently, a need exists for an innovation that will overcome the problems associated with the prior art dead end connector of the DeFrance patent without introducing new problems in place thereof.

SUMMARY OF THE INVENTION

The present invention provides a spring-loaded wedge dead end connector designed to satisfy the aforementioned needs. The dead end connector of the present invention has complementary elements formed on the jaws which directly and slidably interfit with one another and thereby directly couple the jaws to one another for undergoing slidable movement together. Thus, there is no need for employment of a separate floater member in the dead end connector of the present invention to perform this coupling function. The dead end connector of the present invention also has separate retention elements in the form of jaw keepers that are installable to overlie the jaws for preventing their removal from the connector once the keepers are installed.

Accordingly, the present invention is directed to a spring-loaded wedge dead end connector which comprises: (a) a connector body having a base and a pair of opposite jaw guides formed on and protruding outwardly from the base and defining a guide channel therewith, the jaw guides extending in a spaced angular relationship to one another such that the jaw guides and the guide channel defined by the base and the jaw guides converge from a rear end to a front end of the base; (b) a pair of jaws mounted between the jaw guides and on the base of the connector body for undergoing slidable movement within the guide channel thereof along forwardly converging and rearwardly diverging paths between a rearward open position for receiving a segment of an electrical conductor therebetween and a forward closed position in which the jaws provide a clamping wedging engagement with the electrical conductor segment disposed therebetween; and (c) a plurality of complementary elements formed on the jaws such that the complementary elements directly and slidably interfit with one another so as to ensure that the jaws are coupled to one another to undergo the slidable movement together.

The present invention also is directed to a spring-loaded wedge dead end connector which comprises: (a) a connector body having a base and a pair of opposite jaw guides formed on and protruding outwardly from the base and defining a guide channel therewith, the jaw guides extending in a spaced angular relationship to one another such that the jaw guides and the guide channel defined by the base and the jaw guides converge from a rear end to a front end of the base; (b) a pair of jaws mounted between the jaw guides and on the base of the connector body for undergoing slidable movement within the guide channel thereof along forward converging and rearward diverging paths between a forward open position for receiving a segment of an electrical conductor therebetween and a rearward closed position in which the jaws provide a clamping wedging engagement with the electrical conductor segment disposed therebetween; and (c) a pair of jaw keepers separate from and securable on the jaw guides of the connector body so as to overlie the jaws and prevent removal of the jaws from the connector body.

The present invention further is directed to a spring-loaded wedge dead end connector which comprises: (a) a connector body having a base and a pair of opposite jaw guides formed on and protruding outwardly from the base and defining a guide channel therewith, the jaw guides extending in a spaced angular relationship to one another such that the jaw guides and the guide channel defined by the base and the jaw guides converge from a rear end to a front end of the base; (b) a pair of jaws mounted between the jaw guides and on the base of the connector body for undergoing slidable movement within the guide channel thereof along forward converging and rearward diverging paths between a rearward open position for receiving a segment of an electrical conductor therebetween and a forward closed position in which the jaws provide a clamping wedging engagement with the electrical conductor segment disposed therebetween; (c) a plurality of complementary elements formed on the jaws such that the complementary elements directly and slidably interfit with one another so as to ensure that the jaws are coupled to one another to undergo the slidable movement together; and (d) a plurality of retention elements for preventing removal of the jaws from the connector body.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
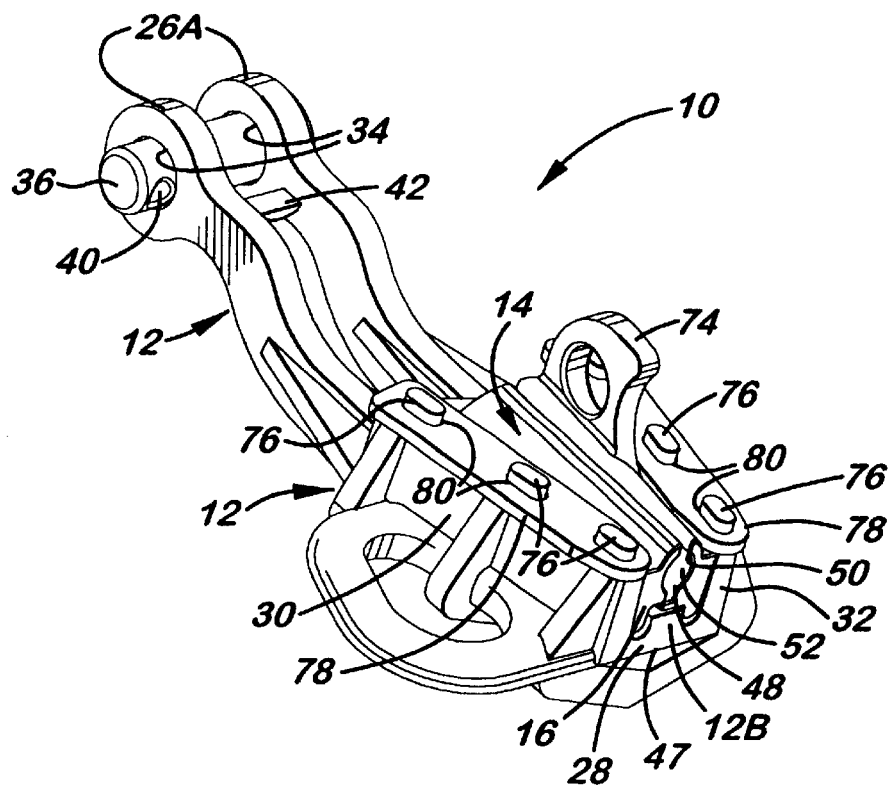
FIG. 1 is a perspective view of a spring-loaded wedge dead end connector of the present invention showing a pair of conductor-gripping jaws of the dead end connector in a closed position.
Figure 2:
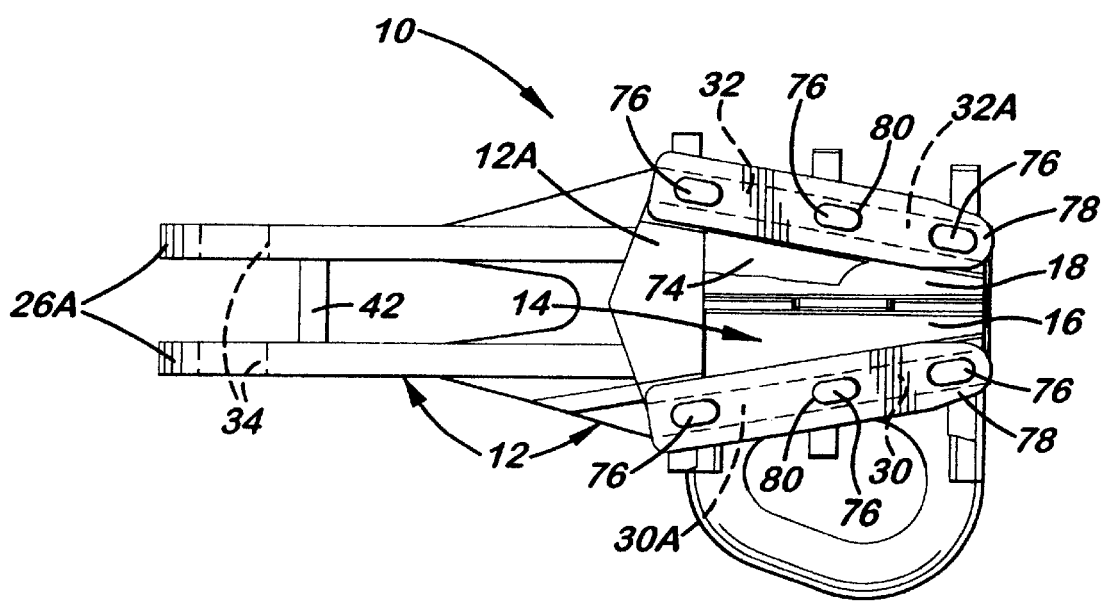
FIG. 2 is a top plan view of the connector of FIG. 1.
Figure 3:
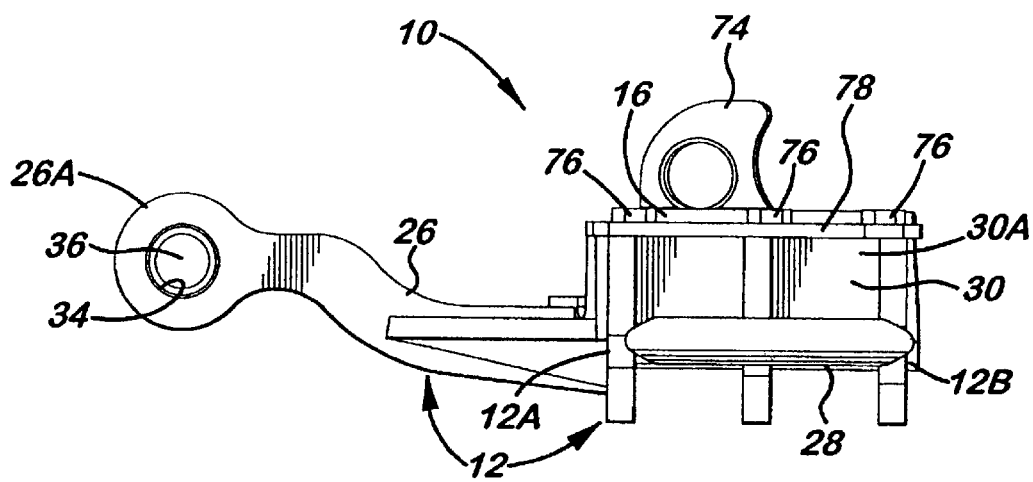
FIG. 3 is a side elevational view of the connector of FIG. 1.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 10:
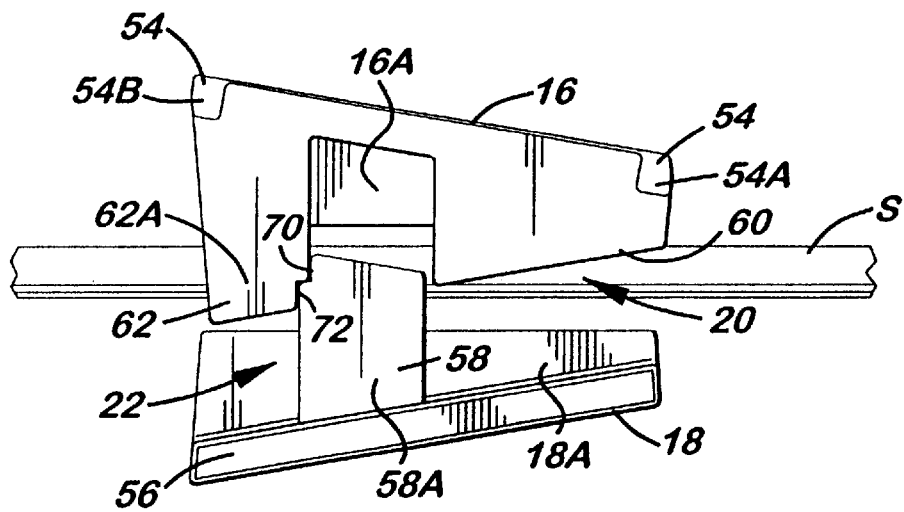
FIG. 10 is a bottom plan view of the jaws shown latched in an open position in which they receive therebetween a connector segment of an electrical transmission line.
Figure 11:
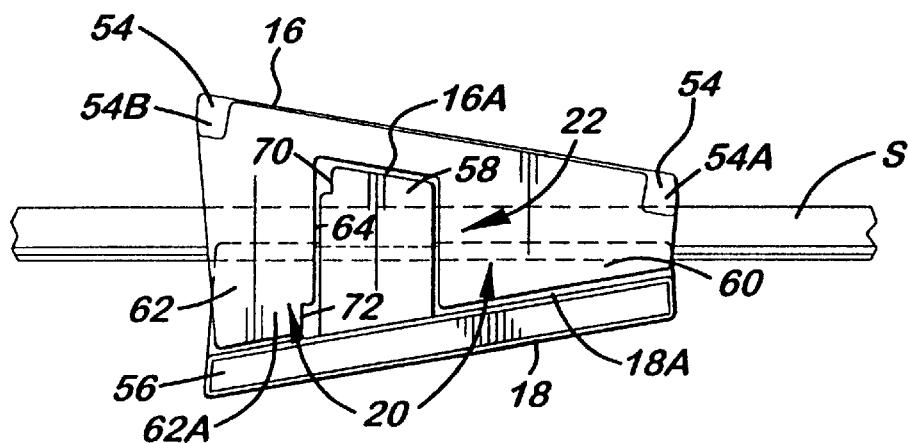
FIG. 11 is a bottom plan view of the jaws shown displaced to a closed position with the connector segment disposed therebetween and the jaws disposed in a clamping wedging engagement therewith.

Referring to the drawings and particularly to FIGS. 1 to 4, there is illustrated a spring-loaded wedge dead end connector of the present invention, generally designated 10. The dead end connector 10 basically includes an elongated connector body 12 having means defining a generally U-shaped guide channel 14, right and left jaws or clamping members 16, 18 mounted to the connector body 12 for undergoing slideable movement within the guide channel 14, a plurality of complementary elements or extension elements 20, 22 (shown in FIG. 7) formed on the right and left jaws 16, 18 which directly and slidably interfit with one another and thereby directly couple the jaws 16, 18 together for undergoing slidable movement in unison with one another, and a pair of separate retention elements 24 (shown in FIG. 6) installable on the connector body 12 so as to overlie the jaws 16, 18 for preventing removal of the jaws 16, 18 from the connector body 12 once installed. The right and left jaws 16, 18 are movable within the guide channel 14 of the connector body 12 along forwardly converging and rearwardly diverging paths between a rearward open position, as seen in FIG. 10, in which the jaws 16, 18 can receive therebetween a conductor segment S of an electrical power line and a forward closed position, as seen in FIG. 11, in which the jaws 16, 18 provide a clamping wedging engagement with the conductor segment or elongated member S disposed therebetween.

Figure 5:
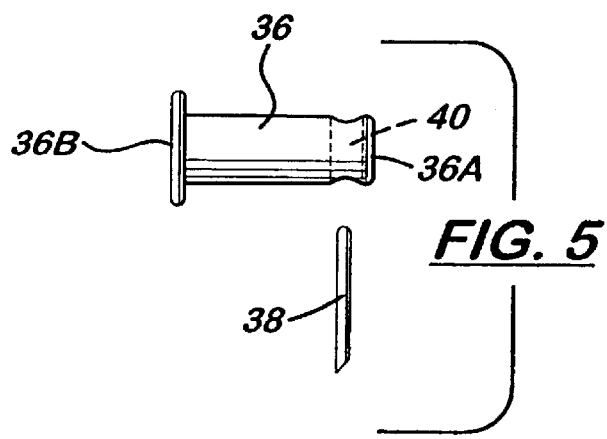
FIG. 5 is a plan view of a clevis pin employed by the connector of FIG. 1.
Figure 6:
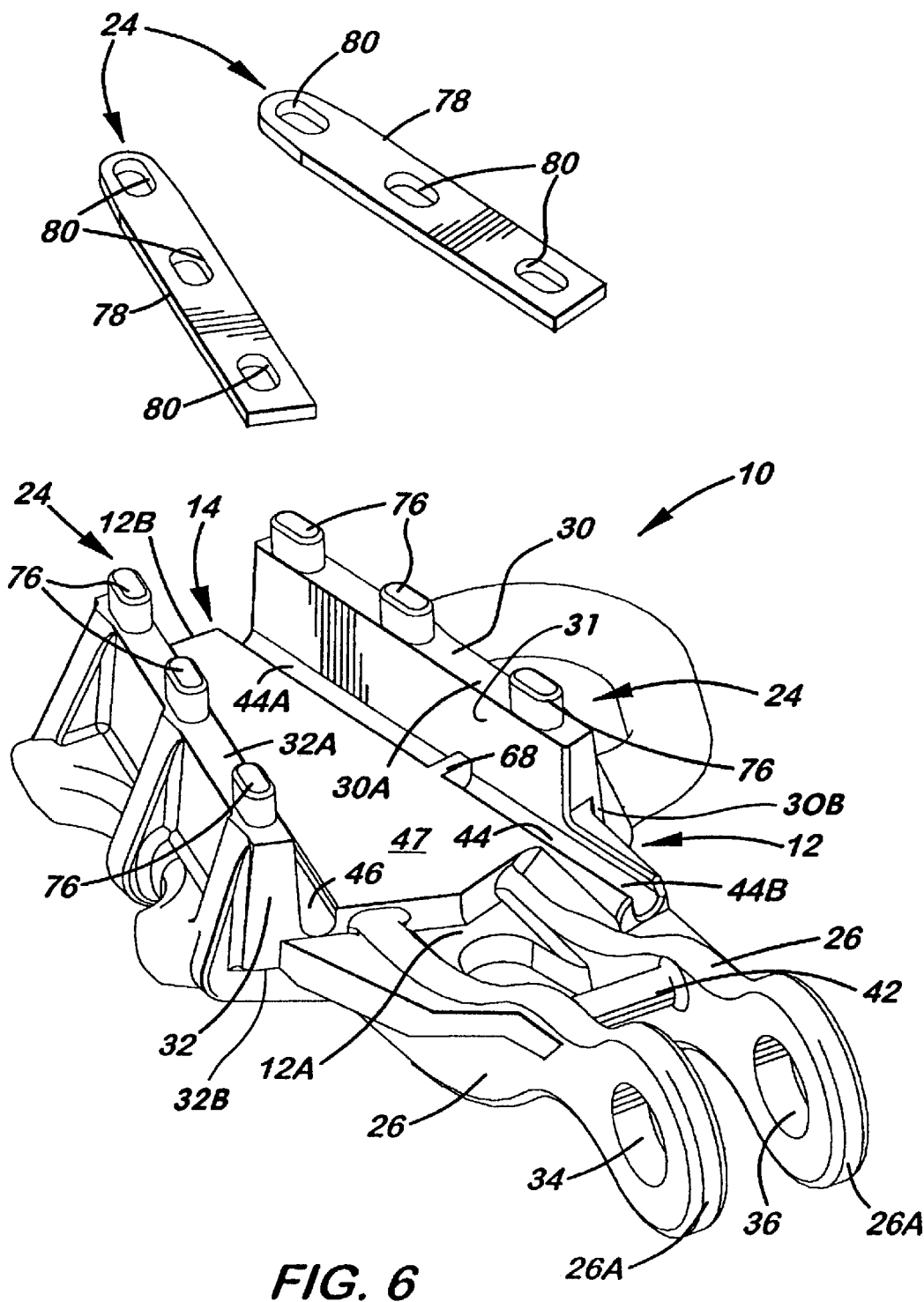
FIG. 6 is a perspective view of a connector body of the connector disposed in an orientation rotated 180° from that of FIG. 1 with the jaws omitted and a pair of jaw keepers of the connector shown exploded from the connector body.
Figure 7:
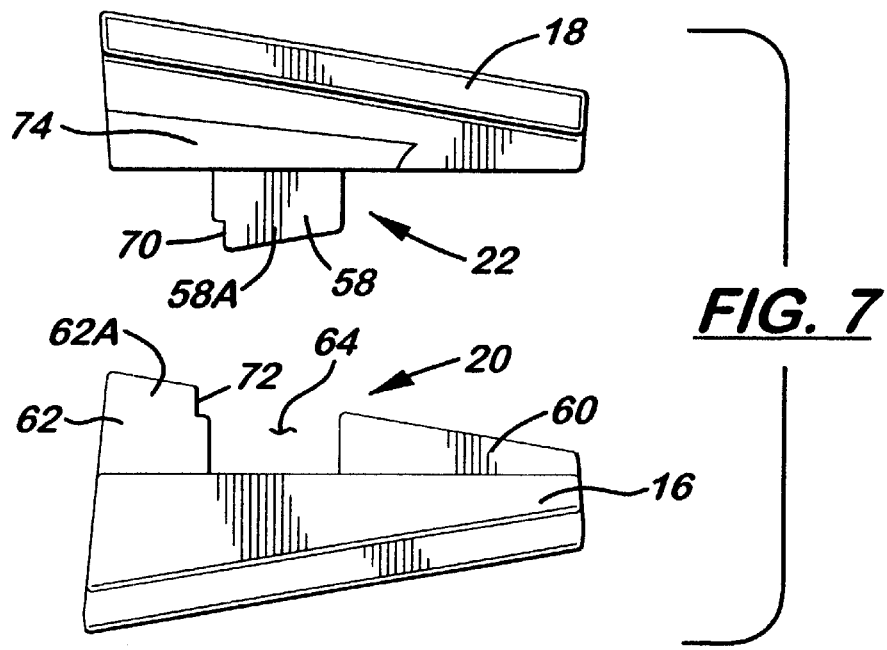
FIG. 7 is an exploded top plan view of the jaws of the connector of FIG. 1.
Figure 8:
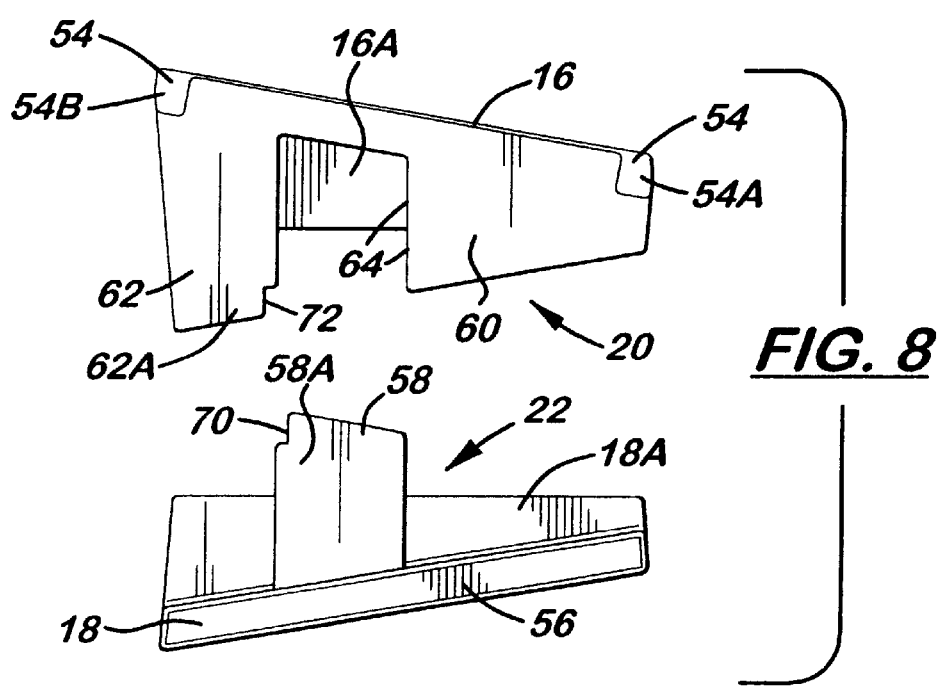
FIG. 8 is a bottom view of the jaws of FIG. 7.
Figure 9:
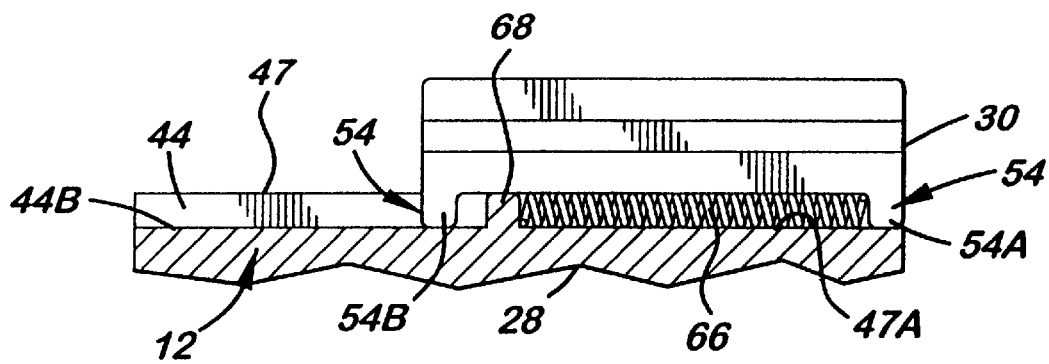
FIG. 9 is a partial side elevational view of the connector of FIG. 1, showing one of the jaws.

As also seen in FIG. 6, the elongated connector body 12 of the connector 10 has rear and front ends 12A, 12B, and dual clevis legs 26 and the means forming the guide channel 14 disposed in tandem relationship between the front and rear ends 12A, 12B. The means forming the guide channel 14 includes a base 28 and right and left jaw guides 30, 32 integrally formed on and protruding outwardly from the base 28 and defining the U-shaped guide channel 14 therewith. The clevis legs 26 are laterally spaced apart and rigidly attached to a rear side of the base 28. The clevis legs 26 extend rearwardly therefrom, terminating at rear ends 26A which have holes 34 formed therethrough. The holes 34 are aligned with one another for receiving a clevis pin 36 or the like, such as seen in FIG. 5, through the holes 34 to facilitate fastening the connector 10 to a pole or the like (not shown). A cotter key 38, as also seen in FIG. 5, can be installed through a bore 40 formed transversely through one end 36A of the clevis pin 36 that is opposite from an enlarged head end 36B thereof to retain the clevis pin 36 through the holes 34 of the rear ends 26A of the clevis legs 26. A bar 42 is located forwardly of the holes 34, transversely spans the space between the clevis legs 26 and is rigidly connected thereto to reinforce the clevis legs 26.

Figure 4:
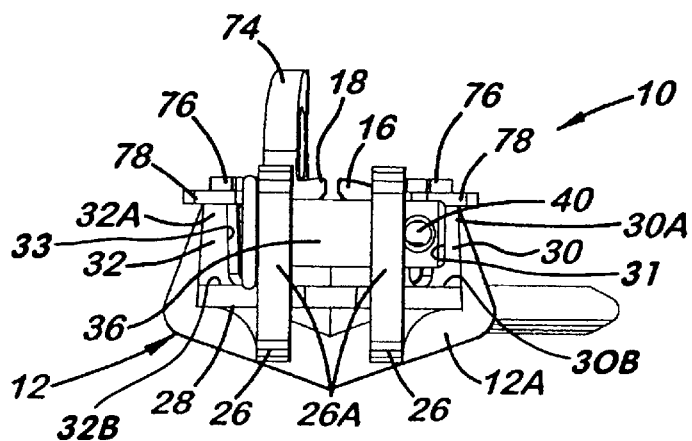
FIG. 4 is a rear end elevational view of the connector of FIG. 1.

The right and left jaw guides or guide walls 30, 32 are integrally formed on and protrude outwardly from the base 28 and extend therealong in a spaced angular relationship to one another. Right and left jaw guides 30 and 32 include opposing inner surfaces 31 and 33 that are substantially continuously planar, particularly between the free ends or outer edges 30A and 32A of jaw guides 30 and 32 and respective base ends 30B and 32B as seen in FIGS. 4 and 6. Base ends 30B and 32B are where jaw guides 30 and 32 meet base 28 with free ends 30A and 32A being opposite or remote from base ends 30B and 32B. The jaw guides 30, 32 converge toward each other so that the U-shaped channel 14 they form with the base 28 gradually narrows in its transverse dimension as the jaw guides 30, 32 extend along the base 28 in a lengthwise direction of the connector body 12 from the rear end 12A to the front end 12B thereof The base 28 has a pair of recessed tracks 44, 46 defined therein which extend parallel to and along the jaw guides 30, 32 and thereby define the forwardly converging and rearwardly diverging paths of slidable movement of the jaws 16, 18. The base 28 also has a relatively planar surface 47 extending between the recessed tracks 44, 46 which underlies and supports the right and left jaws 16, 18 thereon.

The right and left jaws 16, 18 of the connector 10 are slidably supported in the U-shaped channel 14 between the jaw guides 30, 32 and on the base 28. The jaws 16, 18 have respective inner arcuate faces 48, 50 disposed parallel to and opposing one another with multiplicities of teeth 52 formed thereon and protruding therefrom. The jaws 16, 18 also have undersides 16A, 18A facing the recessed tracks 44, 46 and the planar surface 47 of the base 28 extending between the recessed tracks 44, 46. The jaws 16, 18 further have ribs 54, 56 defined along outer edges of the undersides 1 6A, 1 6B which extend along the jaw guides 30, 32 and protrude into the recessed tracks 44, 46 and thus define with the recessed tracks 44, 46 the forwardly converging and rearwardly diverging paths of slidable movement of the jaws 16, 18 along the base 28.

The plurality of complementary elements 20,22 formed on the right and left jaws 16, 18 include a single tab 58 integrally formed on and protruding from an inner side of the left jaw 18 toward the right jaw 16, and a pair of spaced apart forward and rearward tabs 60, 62 integrally formed on and protruding from an inner side of the right jaw 16 toward the left jaw and defining a slot 64 therebetween which receives the single tab 58. Thus, the single tab 58 of the left jaw 18 is directly and slidably interfitted in the slot 64 between the spaced apart forward and rearward tabs 60, 62 of the right jaw 16 so as to directly couple the right and left jaws 16, 18 together such that they will undergo slidable movement in unison with one another within the U-shaped channel 14 along the forwardly converging and rearwardly diverging paths. As the jaws 16, 18 are slidably moved toward the front end 12B of the connector body 12 from the rearward open position of FIG. 10, in which the electrical conductor segment S can be inserted between the jaws 16,18, the jaws 16, 18 move concurrently forwardly and laterally inwardly toward one another and converge toward the lengthwise direction of the connector body 12 such that the multiplicities of teeth 52 on the opposing inner arcuate faces 48, 50 of the jaws 16, 18 will bite into the electrical conductor segment S disposed between the jaws 16, 18 to form the clamping wedging engagement therebetween.

Referring to FIGS. 6 and 8 to 11, the rib 54 of the right jaw 16 and the right track 44 of the base 28 have configurations different from the rib 56 of the left jaw 18 and the left track 46 of the base so as to accommodate the presence of a coil spring 66 to bias the right jaw 16 and the left jaw 18 coupled therewith toward the front end 12B of the connector body 12. More particularly, the rib 54 of the right jaw 16 is provided in the form of a pair of front and rear rib segments 54A, 54B located at the opposite ends of the underside 16A of the jaw 16. The right track 44 has a middle barrier 68 formed intermediately between the opposite ends of the track 44 which partitions or divides the right track 44 into forward and rearward portions 44A, 44B. The right track 44 is longer than the left track 46 so as to ensure that the forward and rearward rib segments 54A, 54B do not go past the opposite ends of the right recessed track 44 with movement of the right jaw 16 between the rearward and forward positions. The coil spring 66 is disposed in the forward portion 44A of the right recessed track 44 and is captured between the front rib segment 54A on the right jaw 16 and the middle barrier 68 in the right track 44. The coil spring 66 becomes compressed as the right jaw 16 and thereby both jaws 16, 18 are moved toward the rear end 12A of the connector body 12 to the rearward open position of the jaws and thereby when the front rib segment 54A is moved toward the middle barrier 68. Thus, the coil spring 66 biases the right jaw 16 and thereby both jaws 16, 18 to move toward the front end 12B of the connector body 12 to the forward closed position of the jaws. The rear inner comer portion 58A of the single tab 58 on the left jaw 18 and the front inner comer portion 62A of the rearward tab 62 on the right jaw 16 have respective notches 70, 72 defined therein which permit hanging up or latching of these portions of the tabs 58, 62 with one another so as to lock the jaws 16, 18 in the rearward open position once the jaws 16, 18 have been slidably pulled rearwardly against the bias of the coil spring 66 toward the rear end 12A of the connector body 12 and 960-29 reach their rearward open position. An eye element 74 is rigidly attached on the left jaw 18 which can be engaged by an operator and employed to slightly move the jaws 16, 18 to cause unlatching the tabs 58, 62 from one another and unlocking of the jaws 16, 18 from the rearward open position and thereby allow the jaws 16, 18 to slidably move forwardly under the influence of the biasing force of the compressed coil spring 66.

Referring to FIGS. 1 to 4 and 6, the separate retention elements 24 of the connector 10 preferably are in the form of a plurality of studs 76 and a pair of jaw keepers 78. The studs 76 are integrally formed on and longitudinally spaced 10 along the outer edges 30A, 32A of the jaw guides 30, 32. The jaw keepers 78 are provided in the form of bars having openings 80 therein which are installable over the studs 76. Once installed, the jaw keepers 78 project inwardly a short distance into the guide channel 14 so as to overlie the outer edge portions of the jaws 16, 18 and thereby prevent removal of the jaws 16, 18 from the connector body 12 and thereby maintain the ribs 54, 56 of the jaws 16, 18 seated in the recessed tracks 44, 46 on the base 28. After installation, the tops of the studs 76 are physically deformed by peening so as to secure the jaw keepers 78 on the jaw guides 30, 32 of the connector body 12.

To recapitulate, the spring-loaded wedge dead end connector 10 of the present invention has features, as described in detail above, that include: (1) spaced apart clevis legs 26 providing a space or opening therebetween for the conductor segment S to pass through and toward the jaws 16, 18 in the guide channel 14; (2) a two part system of spring loaded jaws 16, 18 that lock in the rearward open position; (3) jaw keepers 30, 32 that prevent removal of the jaws 16, 18 after installation of the jaw keepers 30, 32 and thereby retain the jaws 16, 18 and the coil spring 66 assembled together; and (4) a set of complementary elements 20, 22 that directly and slidably interfit with one another at the undersides 16A, 18A of the jaws 16, 18 to ensure that the jaws 16, 18 are directly coupled and will slidably move together without the need for a separate floater member as in the case of the cited prior art connector of the DeFrance patent.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A spring-loaded wedge dead end connector, comprising:
   (a) a connector body having a base and a pair of opposite jaw guides formed on and protruding outwardly from a surface of said base and defining a guide channel therewith, said jaw guides extending in a spaced angular relationship to one another such that said jaw guides and said guide channel defined by said base and said jaw guides converge from a rear end to a front end of said base;
   (b) a pair of jaws mounted between said jaw guides and on said base of said connector body for undergoing slidable movement within said guide channel thereof along forwardly converging and rearwardly diverging paths between a rearward open position for receiving a segment of an electrical conductor therebetween and a forward closed position in which said jaws provide a clamping wedging engagement with the electrical conductor segment disposed therebetween; and
   (c) a plurality of complementary elements formed on said jaws such that said complementary elements directly and slidably interfit with one another so as to ensure that the jaws are coupled to one another to undergo the slidable movement together.

2. The connector as recited in claim 1, wherein said base has a pair of recessed tracks defined in said surface of said base and extending generally parallel to and along said jaw guides and thus converge in the same manner as said jaw guides, said surface of said base extending between said recessed tracks and being substantially planar so as to underlie and support said jaws thereon.

3. The connector as recited in claim 2, wherein said jaws have ribs defined along outer edges of undersides of said jaws which extend along said jaw guides and protrude into said recessed tracks in said base and thus with said recessed tracks define said forwardly converging and rearwardly diverging paths of slidable movement of said jaws along said base.

4. The connector as recited in claim 3, wherein:
   one of said ribs on one of said jaws is provided in the form of a pair of front and rear rib segments located at front and rear ends of said underside of said one jaw; and
   one of said tracks on said base along the one of said jaw guides adjacent to said one jaw has a middle barrier formed intermediately between the opposite ends of said one track which partitions said one track into forward and rearward portions.

5. The connector as recited in claim 4, further comprising:
   a coil spring disposed in said forward portion of said one track and captured between said front rib segment on said one jaw and said middle barrier in said one track such that said coil spring becomes compressed when said one jaw and thereby both jaws are moved toward said rear end of said connector body to said rearward open position of said jaws and thereby when said front rib segment is moved toward said middle barrier and thus said coil spring biases said one jaw and thereby both jaws to move toward said front end of said connector body to said forward closed position of said jaws.

6. The connector as recited in claim 1, wherein said complementary elements are a single tab formed on and protruding from an inner side of one of said jaws toward the other of said jaws and a pair of spaced apart forward and rearward tabs formed on and protruding from an inner side of said other jaw toward said one jaw and defining a slot therebetween which receives said single tab such that said single tab of said one jaw is directly and slidably interfitted in said slot between said spaced apart forward and rearward tabs of said other jaw so as to directly couple said jaws together so that they will undergo slidable movement in unison with one another within said guide channel along said forwardly converging and rearwardly diverging paths.

7. The connector of claim 6, wherein a rear inner corner portion of said single tab on said one jaw and a front inner corner portion of said rearward tab on said other jaw have respective notches defined therein which permit latching of said tabs with one another so as to lock said jaws in said rearward open position once said jaws have been slidably pulled rearwardly against the bias of said coil spring toward said rear end of said connector body and reach their rearward open position.

8. A spring-loaded wedge dead end connector, comprising:
   (a) a connector body having a base and a pair of opposite jaw guides formed on and protruding outwardly from said base and defining a guide channel therewith, said jaw guides extending in a spaced angular relationship to one another such that said jaw guides and said guide channel defined by said base and said jaw guides converge from a rear end to a front end of said base;
   (b) a pair of jaws mounted between said jaw guides and on said base of said connector body for undergoing slidable movement within said guide channel thereof along forwardly converging and rearwardly diverging paths between a rearward open position for receiving a segment of an electrical conductor therebetween and a forward closed position in which said jaws provide a clamping wedging engagement with the electrical conductor segment disposed therebetween; and (c) a pair of jaw keepers separate from and securable on the jaw guides of the connector body so as to overlie the jaws and prevent removal of the jaws from the connector body.

9. The connector as recited in claim 8, wherein said base has a pair of recessed tracks defined in said surface of said base and extending generally parallel to and along said jaw guides and thus converge in the same manner as said jaw guides, said surface of said base extending between said recessed tracks and being substantially planar so as to underlie and support said jaws thereon.

10. The connector as recited in claim 9, wherein said jaws have ribs defined along outer edges of undersides of said jaws which extend along said jaw guides and protrude into said recessed tracks in said base and thus with said recessed tracks define said forwardly converging and rearwardly diverging paths of slidable movement of said jaws along said base.

11. The connector as recited in claim 10, wherein:
one of said ribs on one of said jaws is provided in the form of a pair of front and rear rib segments located at front and rear ends of said underside of said one jaw; and
one of said tracks on said base along the one of said jaw guides adjacent to said one jaw has a middle barrier formed intermediately between the opposite ends of said one track which partitions said one track into forward and rearward portions.

12. The connector as recited in claim 11, further comprising:
a coil spring disposed in said forward portion of said one track and captured between said front rib segment on said one jaw and said middle barrier in said one track such that said coil spring becomes compressed when said one jaw and thereby both jaws are moved toward said rear end of said connector body to said rearward open position of said jaws and thereby when said front rib segment is moved toward said middle barrier and thus said coil spring biases said one jaw and thereby both jaws to move toward said front end of said connector body to said forward closed position of said jaws.

13. A spring-loaded wedge dead end connector, comprising:

(a) a connector body having a base and a pair of opposite jaw guides formed on and protruding outwardly from said base and defining a guide channel therewith;

(b) a pair of jaws mounted between said jaw guides and on said base of said connector body for undergoing slidable movement within said guide channel thereof between an open position for receiving a segment of an electrical conductor therebetween and an closed position in which said jaws provide a clamping engagement with the electrical conductor segment disposed therebetween;

(c) a plurality of complementary elements formed on said jaws such that said complementary elements directly and slidably interfit with one another so as to ensure that said jaws are coupled to one another to undergo the slidable movement together; and (d) a plurality of retention elements for preventing removal of said jaws from connector body.

14. The connector as recited in claim 13, wherein said base has a pair of recessed tracks defined in said surface of said base and extending generally parallel to and along said jaw guides and thus converge in the same manner as said jaw guides, said surface of said base extending between said recessed tracks and being substantially planar so as to underlie and support said jaws thereon.

15. The connector as recited in claim,wherein said jaws have ribs defined along outer edges of undersides of said jaws which extend along said jaw guides and protrude into said recessed tracks in said base and thus with said recessed tracks define said forwardly converging and rearwardly diverging paths of slidable movement of said jaws along said base.

16. The connector as recited in claim 15, wherein:
one of said ribs on one of said jaws is provided in the form of a pair of front and rear rib segments located at front and rear ends of said underside of said one jaw; and
one of said tracks on said base along the one of said jaw guides adjacent to said one jaw has a middle barrier formed intermediately between the opposite ends of said one track which partitions said one track into forward and rearward portions.

17. The connector as recited in claim 16, further comprising:
a coil spring disposed in said forward portion of said one track and captured between said front rib segment on said one jaw and said middle barrier in said one track such that said coil spring becomes compressed when said one jaw and thereby both jaws are moved toward said rear end of said connector body to said rearward open position of said jaws and thereby when said front rib segment is moved toward said middle barrier and thus said coil spring biases said one jaw and thereby both jaws to move toward said front end of said connector body to said forward closed position of said jaws.

18. The connector as recited in claim 12, wherein said complementary elements are a single tab formed on and protruding from an inner side of one of said jaws toward the other of said jaws and a pair of spaced apart forward and rearward tabs formed on and protruding from an inner side of said other jaw toward said one jaw and defining a slot therebetween which receives said single tab such that said single tab of said one jaw is directly and slidably interfitted in said slot between said spaced apart forward and rearward tabs of said other jaw so as to directly couple said jaws together so that they will undergo slidable movement in unison with one another within said guide channel along said forwardly converging and rearwardly diverging paths.

19. The connector of claim 18, wherein a rear inner comer portion of said single tab on said one jaw and a front inner comer portion of said rearward tab on said other jaw have respective notches defined therein which permit latching of said tabs with one another so as to lock said jaws in said rearward open position once said jaws have been slidably pulled rearwardly against the bias of said coil spring toward said rear end of said connector body and reach their rearward open position.

20. The connector of claim 19, wherein said retention elements for preventing removal of said jaws from said connector body includes:
a plurality of studs formed on and longitudinally spaced along outer edges of said jaw guides; and
a pair of jaw keepers adapted to fit over said studs and project inwardly into said guide channel so as to overlie outer edge portions of said jaws and thereby prevent removal of said jaws from said connector body.

21. A connector assembly for an end of a cable, said connector assembly comprising:

a body having front and back ends, opposed top and bottom walls and opposed side walls extending between said top and bottom walls, said top and bottom and side walls defining a cavity extending axially between said front and back ends of said body;

said side walls defining opposed elongated jaw guides at opposite ends of said cavity, said jaw guides being disposed at an angle relative to one another and being spaced apart by a larger distance adjacent said back end of said body and a shorter distance adjacent said front end of said body;

a pair of opposed jaws in said cavity, each jaw having a guide structure at an outer side of said jaw slidably supported in one of said jaw guides, said jaws having interfacing cable grip surfaces at inner sides of said jaws defining an axially extending cable nest;

said top wall having an axially extending cable receiving opening permitting top entry of the cable into said cable nest;

a latch means including jaw tabs extending from each of said jaws, respectively, each tab including first and second engageable notches, respectively, for normally holding said jaws adjacent the back end of said body in an open cocked position in which said cable grip surfaces are separated by a distance larger than a cable diameter; and spring means biasing said jaws toward the front end of said body for moving said jaws forward and together to grip a cable in said cable nest in response to release of said latch means; and a pair of support arms extending rearwardly from said back end with attachment structures at the ends of said support arms, said support arms being spaced apart by a distance at least as large as the cable diameter.

22. The connector assembly of claim 21, said attachment structures comprising mounting holes in distal ends of said arms, said holes having a common centerline parallel to said front and back walls of said body and perpendicular to and intersecting the axis of said cable nest.

23. A dead end connector, comprising:

a connector body including a base with first and second ends, and first and second guide walls extending from said base and converging from said second end to said first end;

first and second clamping members disposed on said base and between said first and second guide walls, said first and second clamping members being slidably movable with respect to said first and second guide walls, respectively, between said first and second ends of said base, and said first and second clamping members defining a receiving area therebetween adapted to receive an elongated member; and first and second extension elements extending from said first and second clamping members, respectively, each of said first and second extension elements extend into said receiving area between said first and second clamping members with said first and second extension elements being engaged as said first and second clamping members slide between said first and second ends of said base, and including respective first and second notches that are engaged at said second end of said base to releasably retain said first and second clamping members at said second end.

24. A dead end connector according to claim 23, wherein said first and second extension elements are directly engaged.

25. A dead end connector according to claim 23, wherein said first and second clamping members are in a closed position when said first and second clamping members are located at said first end of said base, thereby clamping the electrical conductor therebetween.

26. A dead end connector according to claim 23, wherein said first and second clamping members are in an open position when said first and second clamping members are located at said second end of said base, thereby allowing insertion of the elongated member therebetween.

27. A dead end connector according to claim 23, wherein said first extension element is fixed to said first clamping member; and said second extension element is fixed to said second clamping member.

28. A dead end connector according to claim 23, wherein a third extension element extends from said second clamping member so that said first extension element is located between said second and third extension elements.

29. A dead end connector according to claim 23, wherein said first and second clamping members are substantially restricted from moving by retaining members disposed thereon and by said base in a direction perpendicular to the plane of sliding movement of said clamping members.

30. A dead end connector according to claim 23, wherein said elongated member is an electrical conductor.

31. A dead end connector, comprising:

a connector body including a base with opposite first and second ends, and defining a longitudinal length;

first and second clamping members slidably engaged with said base of said connector body and movable between said first and second ends of said base; and first and second guide walls extending from said base of said connector body and converging from said second end to said first end, said first and second guide walls receiving said first and second clamping members in a direction perpendicular to the plane of sliding movement of said clamping members trapping said first and second clamping members between said first and second guide walls.

32. A dead end connector according to claim 31, wherein first and second extension elements extend from said first and second clamping members, respectively, and said first and second extension elements are directly engaged thereby allowing said first and second clamping members to substantially simultaneously slide with respect to said first and second guide walls.

33. A dead end connector according to claim 32, wherein said first and second extension elements include first and second notches, respectively, that are engaged to releasably retain said clamping members at said second end of said base.

34. A dead end connector according to claim 32, wherein said first and second extension elements are fixed to said first and second clamping members, respectively.

35. A dead end connector according to claim 31, wherein said connector body and said first and second guides form a one-piece unitary member.

36. A dead end connector according to claim 31, wherein said first and second clamping members are in a closed position when said first and second clamping members are located at said first end of said base for clamping an electrical conductor therebetween.

37. A dead end connector according to claim 31, wherein said first and second clamping members are in an open position when said first and second clamping members are located at said second end of said base, thereby allowing insertion of an electrical conductor therebetween.

38. A dead end connector, comprising:

a connector body including a base with first and second ends, first and second clamping members slidably engaged with said base of said connector body and movable between said first and second ends of said base; and first and second guide walls extending from said base of said connector body between first and second base ends and converging from said second end to said first end, said first and second guide walls including first and second opposing inner surfaces, respectively, that are substantially continuously planar between said base and respective first and second free ends remote from said base, said first and second free ends defining an opening sized to receive said first and second clamping members.

39. A dead end connector according to claim 38, wherein said connector body and said first and second guide walls form a one-piece unitary member.

40. A dead end connector according to claim 38, wherein said first and second clamping members are received between said first and second guide walls.

41. A dead end connector according to claim 39, wherein each of said first and second clamping members includes an extension element, said extension elements are directly engaged to allow substantially simultaneous movement of said first and second clamping members between said first and second ends of said base.

42. A dead end connector according to claim 41, wherein each of said extension elements are fixed to the respective clamping member.

43. A dead end connector according to claim 41, wherein each of said extension elements includes a notches; and said notches are engages to releasably retain said clamping members at said second end of said base.

* * * * *